United States Patent [19]

Ninoyu et al.

[11] 4,359,124
[45] Nov. 16, 1982

[54] CONSTANT RUNNING SPEED CONTROL SYSTEM FOR AUTOMOBILE

[75] Inventors: Yutaka Ninoyu; Motoyoshi Suzuki, both of Kariya, Japan

[73] Assignee: Nippondenso Co., Ltd., Kariya, Japan

[21] Appl. No.: 195,501

[22] Filed: Oct. 9, 1980

[30] Foreign Application Priority Data

Oct. 16, 1979 [JP] Japan .................. 54-133759

[51] Int. Cl.³ ............................................. B60K 31/00
[52] U.S. Cl. ................................... 180/176; 123/353; 123/360; 180/177
[58] Field of Search ............. 180/176, 177; 123/352, 123/353, 355, 360

[56] References Cited
U.S. PATENT DOCUMENTS

| | | | |
|---|---|---|---|
| 3,889,647 | 6/1975 | Rachel | 123/353 |
| 3,952,829 | 4/1976 | Gray | 180/177 |
| 4,056,157 | 11/1977 | Kawata | 123/353 |
| 4,094,378 | 6/1978 | Scheyhing et al. | 180/176 |
| 4,134,373 | 1/1979 | Kibler et al. | 123/353 |
| 4,215,760 | 8/1980 | Sakakibara et al. | 123/360 |
| 4,232,757 | 11/1980 | Ochiai et al. | 180/177 |

*Primary Examiner*—Joseph F. Peters, Jr.
*Assistant Examiner*—Donn McGiehan
*Attorney, Agent, or Firm*—Cushman, Darby & Cushman

[57] ABSTRACT

A fluid actuator for electrically detecting the running speed of a vehicle and processing the detected data and an electric control system for driving said actuator are provided, and in the electric control system a delay involved in the response of the fluid actuator to a change of the running speed of the vehicle is compensated for in advance by a filter means to thereby automatically maintain a constant running speed of the vehicle.

3 Claims, 4 Drawing Figures

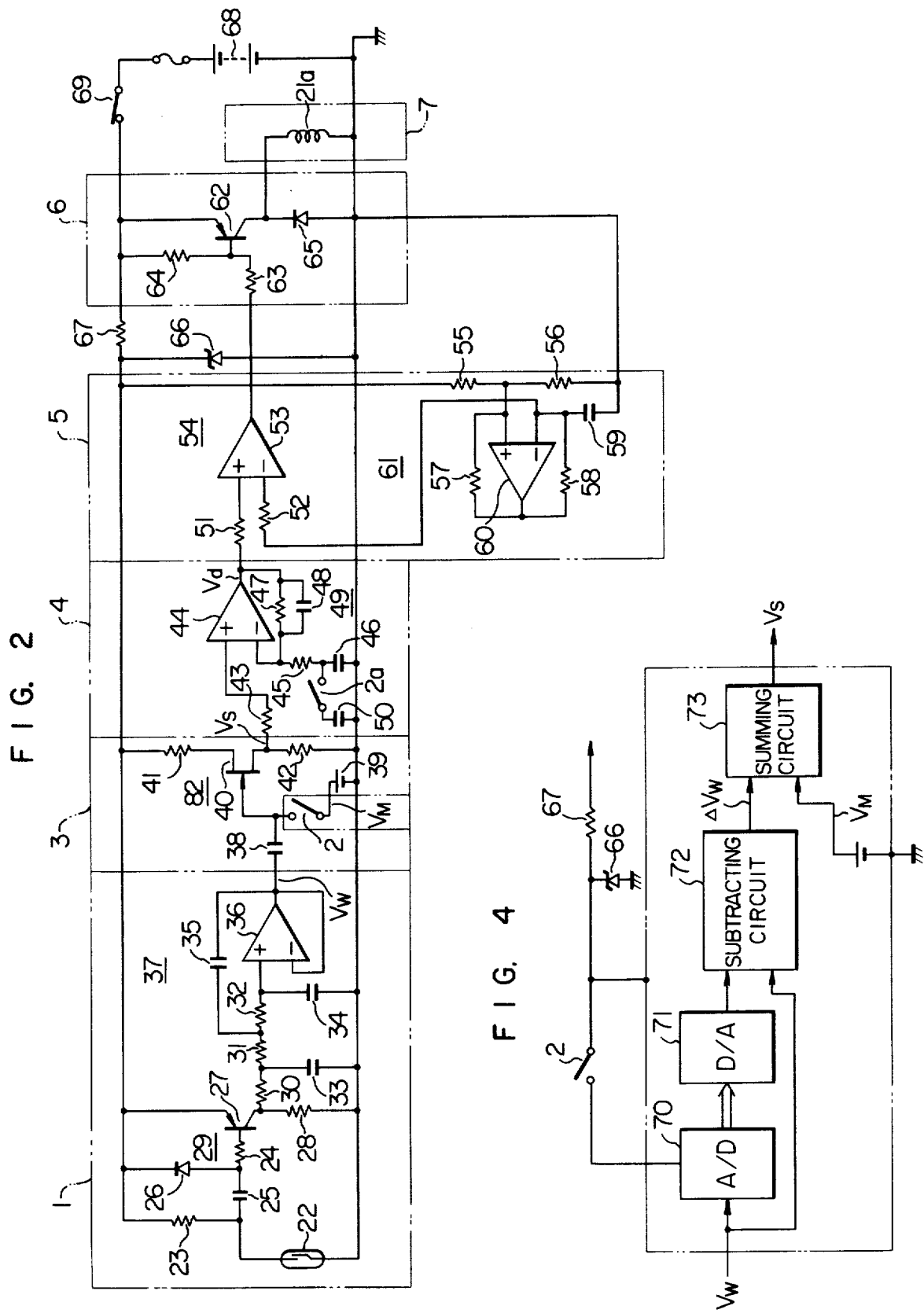

CONSTANT RUNNING SPEED CONTROL SYSTEM FOR AUTOMOBILE

BACKGROUND OF THE INVENTION

1. Field of the Invention

This invention relates to a constant running speed control system for automatically controlling the running speed of a vehicle provided with an engine at a constant speed.

2. Description of the Prior Art

Hitherto, there have been proposed various vehicle running speed control systems, and recently those using fluid actuators for causing displacement of vehicle speed adjustment elements have been attracting attention. The main reasons for this are that the actuator is inexpensive in cost and particularly in case of a vehicle using an internal combustion engine as the drive power source it is possible to make use of the intake negative pressure as the operating pressure. Generally, however, the fluid actuator has drawbacks in that a delay time is involved in its response to a control command. Besides, restrictions are imposed upon the utility of the engine intake negative pressure in order to prevent deterioration of the engine combustion performance. The problem of the delay of the response of the actuator has not been solved so far as the construction of the actuator itself is concerned.

SUMMARY OF THE INVENTION

In light of the above, the primary object of the invention is to provide a constant running speed control system, which eliminates the hunting or irregular vehicle running speed in spite of the fact that it uses a fluid actuator providing a response delay.

To achieve the above objective, the invention features an electric control system, which drives the fluid actuator by electrically detecting the vehicle running speed and processing the detected value and includes a filter means for compensating for the delay involved in the response of the fluid actuator in advance with respect to changes of the vehicle speed.

BRIEF DESCRIPTION OF THE DRAWINGS

FIG. 2 is a circuit diagram showing an electric control circuit of the control system according to the invention.

FIG. 4 is a circuit diagram showing a modification of part of the circuit of FIG. 2.

DESCRIPTION OF THE PREFERRED EMBODIMENTS

Figure 1:
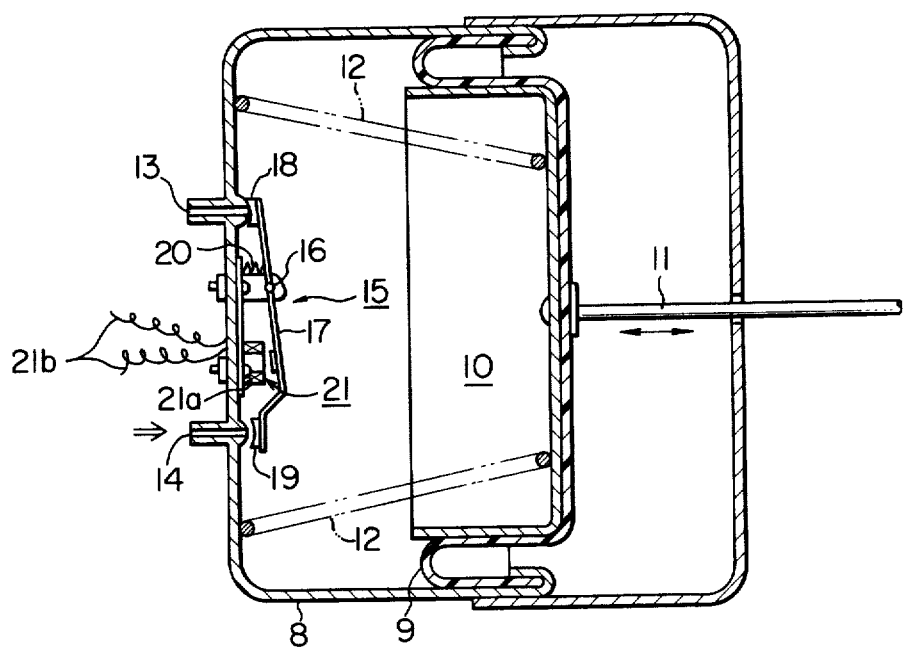
FIG. 1 is a sectional view showing a fluid actuator used in accordance with the invention.

The invention will now be described in conjunction with an illustrated embodiment thereof. FIG. 1 shows a fluid actuator used in accordance with the invention. As is shown, a fluid chamber 10 is defined by a cup-shaped metal housing 8 and a pressure-bearing movable film (or diaphragm) 9 caulked to the open end of the housing. A rod 11 secured to the diaphragm 9 is adapted to be moved to a position of balance between the air pressure in the fluid chamber 10 and the restoring force of a spring 12. It is coupled to a throttle valve mechanism (not shown) of the vehicle engine and functions to control the throttle valve aperture for controlling the vehicle running speed. The housing 8 is provided in its bottom wall with two passages 13 and 14, the passage 13 being connected to an intake tube (not shown) of the vehicle engine and the other passage 14 communicating with the atmosphere. an electromagnetic valve mechanism 15 for alternately opening and closing the two passages 13 and 14 is provided inside the housing 8. It includes an arm 17 pivoted to a support post 16 secured to the housing, valve seats 18 and 19 secured to the arm 17 and is capable of alternately opening and closing the passages 13 and 14, a spring 20 biasing the arm 17 in a direction to close the negative pressure passage 13 with the valve seat 18 and an electromagnet 21 adapted to attract the arm 17 so as to close the atmospheric pressure passage 14 with the other valve seat 19. When a coil 21a of the electromagnet 21 is energized through leads 21b, negative pressure is supplied through the negative pressure passage 13 to the interior of the fluid chamber 10, while in the non-energized state of the coil the atmospheric pressure is coupled through the atmospheric pressure passage 14 to the fluid chamber 10. By changing the on-off ratio, i.e., the ratio between the energization and non-energization periods of the electromagnet 21, the air pressure in the fluid chamber 10 is correspondingly changed to change the position of the rod 11.

The on-off frequency, at which the electromagnet 21 is energized and de-energized, is fixed to several 10 Hz, and the response performance of the fluid actuator, i.e., the rate of change of the position of the rod 11 corresponding to the rate of change of the afore-mentioned on-off ratio, is determined by the volume of the fluid chamber 10, restoring force of the springs 12, diameters of the passages 13 and 14, effective area of the diaphragm 9, and difference between the negative pressure and atmospheric pressure, etc. Usually, a frequency characteristic as shown by plot A in FIG. 3 (with the abscissa representing the rate of change of the on-off ratio) is obtained. However, the introduction of the intake negative pressure is limited by the considerations of the combustion performance of the engine, thus imposing restrictions upon the upper limit of the response performance.

Figure 3:
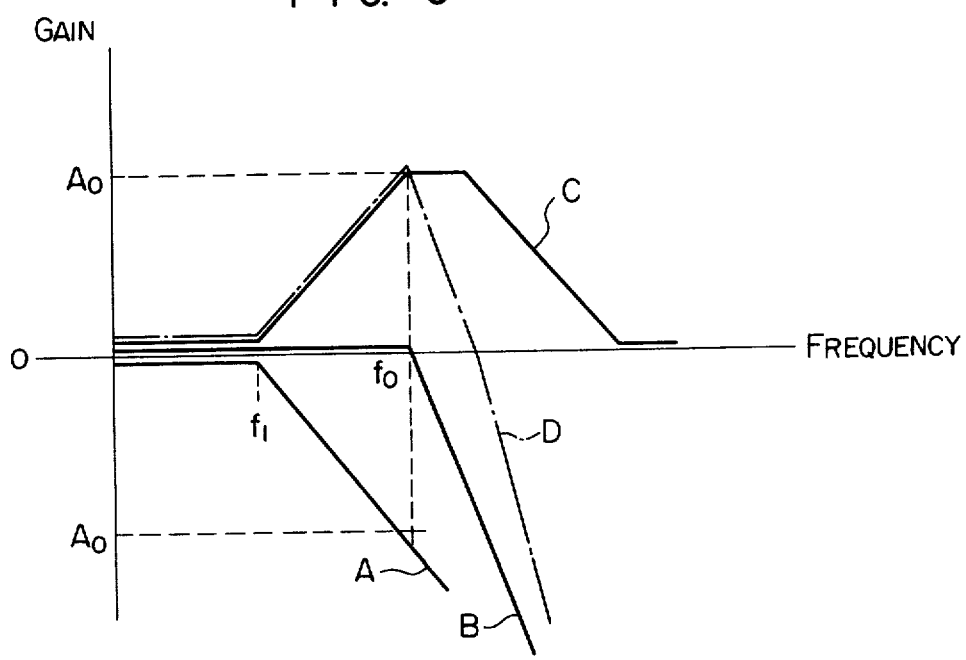
FIG. 3 is a graph showing approximate gain versus frequency characteristics of various component parts of the system for illustrating the operation thereof.

Generally, when a change of the vehicle speed due to a change of the road surface parameter or the like corresponds to a frequency component of the order of 1 Hz or below, it is necessary to correct the position of the speed governer element according to the vehicle speed change. On the other hand, the response performance of the fluid actuator is as shown in FIG. 3, with the gain attenuation frequency $f_1$ being about 0.1 Hz, which is considerably low.

Now, an electric control circuit, which functions to maintain the vehicle running speed constant through the control of the energization and de-energization of the electromagnet 21 of the fluid actuator, will now be described. As shown in FIG. 2, this electrical control circuit includes a vehicle speed detection circuit 1 for producing a vehicle speed voltage corresponding to the vehicle running speed, a manually operable switch 2 which is operated by the driver of the vehicle, a vehicle speed change component extraction circuit 3 for memorizing data concerning the vehicle speed voltage at the instant of operation of the manually operable switch 2 and producing, when the vehicle speed voltage representing the actual vehicle speed changes from the memorized vehicle speed voltage at the time of the operation of the switch, a signal voltage corresponding to the extent of the change, a filter circuit 4 having a frequency characteristic of a band-pass filter, a modulating circuit 5 for producing a pulse train signal of an on-off ratio corresponding to the magnitude of the input voltage, a power amplifeir circuit 6 and a fluid actuator energization circuit 7.

The vehicle speed detection circuit 1 consists of a read switch 22 on-off operated in synchronization to the rotation of a meter cable of the speed meter of the vehicle, a pulse generator circuit 29 having resistors 23 and 24, a capacitor 25, a diode 26, a transistor 27 and a resistor 28 and producing a rectangular pulse signal synchronized to the opening and closing of the read switch 22 and a low-pass filter circuit 37 of a third order Butterwoth characteristic having resistors 30, 31 and 32, capacitors 33, 34 and 35 and an operational amplifier 36 and integrating and smoothing the input pulse signal. A d-c voltage (vehicle speed voltage) $V_w$ which is proportional to the vehicle running speed and contains very little ripple is obtained from the output terminal of the operational amplifier 36. The response character of the vehicle speed voltage $V_W$ with respect to the vehicle speed changes is represented as a frequency characteristic having the third order Butterwoth characteristic as shown by plot B in FIG. 3, with the gain attenuation characteristic being set substantially to 1 Hz. By setting the attenuation factor to a high value with a high order Butterwoth characteristic it is possible to prevent the response of the following stage circuit to frequency components that accompany the opening or closing of the read switch 22 or electric noise.

The vehicle speed change component extraction circuit 3 consists of a capacitor 38, which receives at its first terminal the vehicle speed voltage $V_W$ from the vehicle speed detection circuit 1 and at its second terminal a constant reference voltage $V_M$ provided from a reference voltage source (resistive voltage divider circuit) 39 at the time of the closure of the afore-mentioned manually operable switch 2, and a source follower type signal read-out circuit 42 having a field-effect transistor (FET) 40 and resistors 41 and 42. When the manually operable switch 2 is opened after its closure, the capacitor 38 memorizes across it a difference voltage ($V_W - V_M$) between the vehicle speed voltage $V_W$ applied to its first terminal at that instant and the constant reference voltage $V_M$. When the vehicle speed voltage $V_W$ is subsequently changed with a change of the vehicle speed, a voltage of a value corresponding to the reference voltage $V_M$ plus the increment $\Delta V_W$ of the vehicle speed voltage appears at the second terminal of the capacitor 38. Thus, the voltage across the source load resistor 41 connected to the source of the FET 40 is substantially equal to the reference voltage $V_M$ immediately before the opening of the manually operable switch 2, and with the subsequent change of the vehicle speed voltage $V_M$ it is changed to a value $V_S$ substantially equal to the sum of the increment $\Delta V_W$ of the vehicle speed voltage and the reference voltage $V_M$.

The filter circuit 4 consists of a voltage follower type operational amplifier 44 receiving the output voltage $V_S$ of the vehicle speed change component extraction circuit 3 through an input resistor 43 and a phase advancing/retarding circuit 49 having a series combination of a resistor 45 and a capacitor 46 and a parallel combination of a resistor 47 and a capacitor 48. At the response character of the output voltage $V_d$ of the filter circuit 4 with respect to the input voltage $V_s$ thereto, a band-pass filter characteristic as shown by plot C in FIG. 3 is provided. More particularly, the gain of the filter is gradually increased over a region from a frequency (about 0.1 Hz) substantially equal to the afore-mentioned gain attenuation characteristic frequency $f_1$ in the response characteristic of the fluid actuator to the gain attenuation frequency $f_0$ (about k Hz) of the vehicle speed detection circuit 1, and the slope of this characteristic is practically opposite to that of the characteristic of the plot A. The gain $A_0$ for the frequency $f_0$ may be set to, for instance, about 20 dB. For higher frequencies the filter gain is reduced to prevent malfunction of the circuit provided after the filter circuit 40 with respect to electric noise.

Thus, the output voltage $V_d$ of the filter circuit 4 corresponds to the reference voltage $V_M$ and the increment $\Delta V_W$ of the vehicle speed voltage and has an overall gain characteristic with respect to the rate of change of the increment $\Delta V_W$ of the vehicle speed voltage as shown by plot D in FIG. 3. This gain characteristic D corresponds to the resultant combination of the frequency characteristic of the vehicle speed detection circuit 1 and the frequency characteristic of the filter circuit 4, with the gain increased over the frequency range between $f_1$ and $f_0$, over which a delay time is involved in the response of the fluid actuator. Thus, with the output voltage $V_d$ the delay involved in the response of the fluid mechanism is electrically cancelled. Also, a frequency range above about 1 Hz is usually irrelevant to the vehicle speed control, so that for that frequency range the gain is reduced to prevent the malfunction of the system and the hunting.

For the stabilization of the operation of the phase advancing/retarding circuit 49 at the time of the operation of the manually operable switch 2, a switch 2a interlocked to the manually operable switch 2 and a reference voltage source 50 are provided, and during the closure of the manually operable switch 2 a reference voltage substantially of the same magnitude as the output voltage $V_S$ is supplied to the juncture between the resistor 45 and capacitor 46.

The modulating circuit 5 consists of a comparator circuit 54 having input resistors 51 and 52 and an operational amplifier 53 and a triangular wave oscillator circuit 60 having resistors 55, 56, 57 and 58, a capacitor 59 and an operational amplifier 60. In the triangular wave oscillator circuit 60 the circuit constants are set such as to produce a triangular signal voltage at a constant frequency, for instance 30 Hz, and having a constant amplitude, and the crossing of the output voltage $V_d$ of the filter circuit 4 by the triangular wave signal voltage is detected to produce a pulse train signal of an on-off ratio corresponding to the magnitude of the output voltage $V_d$.

The chnage of the output voltage $V_d$, which represents in effect a corresponding change of the vehicle speed, and the amplitude of the triangular wave signal voltage are related to each other in such a manner as to control the position of the speed governer element of the vehicle for suppressing changes of the vehicle speed, and the on-off ratio of the pulse train signal is changed in a predetermined ratio in proportion to the change of the output voltage $V_d$.

The power amplifier circuit 6 has an amplifying transistor 63, resistors 63 and 64 and a surge absorption diode 65 and amplifies the pulse train signal from the modulating circuit 5 for switching the energization and de-energization of the exciting coil 21a of the electromagnet 21, the coil 21a being connected as a collector load to the transistor 62, thereby determining the supply of the negative pressure and atmospheric pressure to the fluid chamber 10 in the fluid actuator.

Designated at 66 and 67 respectively are a zener diode and a resistor, which are provided for supplying a constant operating voltage to the aforementioned circuits 1, 3, 4 and 5. The power amplifier circuit 6 is furnished with power from a battery mounted in the vehicle through a main switch 69.

The electric control circuit of the above construction is rendered into a waiting state with the closure of the main switch 69, and in this state the constant running speed control is started by closing and opening the manually operable switch 2. At this time, the capacitor 38 memorizes the difference between the vehicle speed voltage $V_W$ coupled from the vehicle speed detection circuit 1 and the reference voltage $V_M$ coupled from the reference voltage source 39. At this instant, the output voltage $V_S$ of the vehicle speed change extraction circuit 3 is substantially the same as the reference voltage $V_M$, and the output voltage $V_d$ of the filter circuit 4 also has substantially the same value. At the time of the commencement of the constant running speed the modulating circuit 5 produces a pulse train signal of a constant on-off ratio for driving the fluid actuator.

When the aperture of the throttle valve, the position of which is controlled by the fluid actuator, is not suited to maintain the vehicle speed detected at the time of the operation of the manually operable switch 2, the vehicle speed is changed, and this change is coupled as an increment $\Delta V_W$ of the vehicle speed voltage $V_W$ to the first terminal of the capacitor 38. As a result, the output voltage $V_S$ of the vehicle speed change component extraction circuit 3 is changed to a value substantially equal to $(V_M + \Delta V_W)$. When the vehicle speed is gently changed, the output voltage $V_d$ of the filter circuit 4 is changed substantially in accordance with the voltage $V_S$, and the on-off ratio of the pulse train signal produced from the modulating circuit 5 is correspondingly changed to move the throttle valve in a direction to cancel the increment $\Delta V_W$ of the vehicle speed voltage $V_W$. Since the adjustment position of the throttle valve of the fluid actuator corresponding to the on-off ratio of the pulse train signal is in a linear relation to the on-off ratio over a low range of the ratio (for instance up to several percent of about 50 percent), the electric control circuit controls in this case the actual running speed to bring it to be substantially coincident with the goal speed without effecting the comparison of the actual running speed and goal speed. Similar constant running speed control is effected in the case when the vehicle speed voltage $V_W$ is changed due to changes of the road surface conditions such as the slope of the road surface.

When the vehicle speed is comparatively sharply changed so that the change appears as the increment $\Delta V_W$ of the vehicle speed voltage $V_W$, i.e., when a vehicle speed change corresponding to the region between $f_1$ and $f_0$ in FIG. 3 is produced, the gain of the filter circuit 4 is increased in accordance with the rate of change of the vehicle speed voltage $V_W$. In this case, the output voltage $V_d$ of the filter circuit 4 is changed to a value corresponding to a case when a vehicle speed change greater than the actual vehicle speed change is produced, and the on-off ratio of the pulse train signal is modulated to drive the fluid actuator. While the delay time involved in the response of the fluid actuator is the longer the greater the rate of change of the on-off ratio of the pulse train signal coupled to the actuator, since the rate of change of the on-off ratio is corrected in advance to a greater value by the filter circuit 4, the pressure in the fluid chamber 10 of the fluid actuator is sufficiently quickly changed to meet the actual vehicle speed change, so that it is possible to obtain stable constant running speed control without lagging behind sharp vehicle speed changes.

When the vehicle speed change corresponds to a frequency higher than the afore-mentioned region in FIG. 3, the electric control circuit does not respond to this change. Thus, it is possible to reliably prevent malfunction with respect to a vehicle speed change beyond the ordinary vehicle speed change region.

As has been shown, when the rate of change of the vehicle speed is caused due to a change of a road surface condition or the like, corresponds to a frequency less than about 1 Hz, the electronic control circuit effects adjustment of the speed governing function of the fluid actuator while making compensation for the delay involved in the response of the actuator, thus effecting adequate adjustment of the position of the throttle valve as the speed governing element to maintain the constant running speed.

The afore-mentioned construction according to the invention is by no means limitative, and various modifications are possible. For example, the circuits 1, 3, 4, 5 and 6 may be replaced with other equivalent circuits so long as their basic functions are met.

FIG. 4 shows an example of the modification of the vehicle speed change component extraction circuit 3. This example includes a digital memory circuit, which has an analog-to-digital (A/D) converter 70 and a digital-to-analog (D/A) converter 71. At the timing of closing and opening the manually operable switch 2, the memory circuit converts the vehicle speed voltage $V_W$ into a digital binary value and memorizes it and then produces a corresponding analog signal voltage. This analog signal voltage is coupled together with the vehicle speed voltage $V_W$ to a subtracting circuit 72, and the resultant difference voltage, i.e., the increment $\Delta V_W$ of the vehicle speed voltage, is produced from the subtracting circuit 72. The increment $\Delta V_W$ is coupled to a summing circuit 73, and the sum of a constant reference voltage $V_M$ from a reference voltage source (resistive voltage divider) 76 and the increment $\Delta V_M$ is produced as the output voltage $V_S$ from the summing circuit 73.

Further, the filter circuit 4 may be constituted by a T-type resistor-capacitor circuit as well.

As has been described in the foregoing, according to the invention, by compensating for the delay time involved in the fluid actuator with the frequency characteristic of a filter means it is possible to maintain substantially a constant response character with respect to vehicle speed changes, thus permitting a constant running speed to be steadily maintained. In addition, for the compensation for the delay time in the actuator no additional construction such as that for detecting the working position of the actuator and feeding the detected position back to the input side of the control system is required at all, so that it is possible to provide a construction, which is simple, small in size and light in weight.

We claim:

1. A constant running speed control system for a vehicle comprising:

an actuator including a fluid chamber having a pressure-bearing movable film operatively coupled to a speed governing element of the vehicle and an electromagnetic valve for causing intermittent modulation of the pressure of fluid supplied to said fluid chamber, said actuator functioning to cause displacement of said speed governing element according to the pressure in said fluid chamber;

a manually operable switch means for starting a constant running speed control;

a vehicle speed detecting means for producing a vehicle speed voltage corresponding to the running speed of the vehicle;

a vehicle speed change component extraction means for receiving said vehicle speed voltage from said vehicle speed detecting means, memorizing said vehicle speed voltage at the time of the operation of said manually operable switch and providing an output voltage corresponding to the difference between said memorized vehicle speed voltage and the actual vehicle speed voltage from said vehicle speed detecting means in addition to a predetermined reference voltage;

a filter means having a frequency characteristic adapted to cancel the frequency characteristic of said actuator and receiving said output voltage from said vehicle speed change component extraction means, the gain of said filter means being increased for a rate of change of said output voltage within a range corresponding to a predetermined frequency range;

a modulating means for producing a pulse train signal of an on-off ratio corresponding to the magnitude of the output voltage passed through said filter means;

a power amplifying means for amplifying said pulse train signal from said modulating means, the resultant amplified signal being coupled to said electromagnetic valve in said actuator; and a circuit for supplying power to said actuator;

said filter means serving to compensate for the delay involved in said actuator in advance to thereby automatically maintain a constant vehicle running speed.

2. A constant running speed control system for a vehicle according to claim 1, wherein said vehicle speed detecting means includes a pulse generating circuit for producing a pulse signal every time a unit running distance is covered by the vehicle and a low-pass filter circuit having a high order Butterwoth characteristic for increasing the gain of said filter means for a predetermined frequency range.

3. A constant running speed control system for a vehicle according to claim 1, wherein said filter means is a band-pass filter circuit, the gain of said band-pass filter circuit being increased for a predetermined frequency range.

* * * * *